United States Patent
Xiao et al.

(10) Patent No.: US 9,871,893 B2
(45) Date of Patent: Jan. 16, 2018

(54) METHOD FOR MAKING 32-BIT ADDRESSING OF SV DATA BY UTILIZING FPGA

(71) Applicant: Beijing Sifang Automation Co., Ltd, Beijing (CN)

(72) Inventors: Zhengqiang Xiao, Beijing (CN); Zhiguang Hou, Beijing (CN); Haitao Yuan, Beijing (CN); Jiong Hu, Beijing (CN); Tao Zhou, Beijing (CN); Qiurong Chen, Beijing (CN); Wanfang Xu, Beijing (CN); Kun Xiao, Beijing (CN); Tongzhong Fang, Beijing (CN)

(73) Assignee: Beijing Sifang Automation Co., Ltd, Beijing (CN)

( * ) Notice: Subject to any disclaimer, the term of this patent is extended or adjusted under 35 U.S.C. 154(b) by 208 days.

(21) Appl. No.: 14/652,516

(22) PCT Filed: Oct. 28, 2013

(86) PCT No.: PCT/CN2013/001302
§ 371 (c)(1),
(2) Date: Jun. 16, 2015

(87) PCT Pub. No.: WO2014/094350
PCT Pub. Date: Jun. 26, 2014

(65) Prior Publication Data
US 2015/0341471 A1 Nov. 26, 2015

(30) Foreign Application Priority Data
Dec. 20, 2012 (CN) .......................... 2012 1 0559297

(51) Int. Cl.
*H04L 29/06* (2006.01)
*H04L 12/741* (2013.01)

(52) U.S. Cl.
CPC .............. *H04L 69/08* (2013.01); *H04L 45/74* (2013.01); *H04L 69/22* (2013.01)

(58) Field of Classification Search
CPC .......... H04L 69/08; H04L 69/22; H04L 45/74
See application file for complete search history.

(56) References Cited

FOREIGN PATENT DOCUMENTS

| CN | 201639363 U | 11/2010 |
|---|---|---|
| CN | 101958581 A | 1/2011 |

(Continued)

OTHER PUBLICATIONS

Feng, et al., "Network message monitoring and fault recording integrated device for intelligent transformer substation", Jan. 26, 2011, CN101958581A Google Patent Translation, 16 pages.*

(Continued)

*Primary Examiner* — Brian J Gillis
*Assistant Examiner* — Amy Ling
(74) *Attorney, Agent, or Firm* — Muirhead and Saturnelli, LLC

(57) ABSTRACT

This invention relates to a method for making 32-bit addressing of SV data by utilizing FPGA, which may be applied to processing digital sampling data in an equipment of an intelligent substation. Specifically, the method includes the following steps: FPGA receiving naked SV data packages generated based on IEEE802.3 standard; analyzing data structure of Ethernet frame; based on characteristics of the Ethernet frame of the SV data, the SV data of the network byte sequence being reorganized by utilizing ASN.1 coding rules, so that the SV data being converted into a data that can be directly accessed by 32-bit addressing processors. As a result, SV data decoding efficiency is improved greatly. This invention may make the decoding efficiency of 32-bit addressing processor improved by 5-10 times, thus solve (Continued)

problem of declined efficiency due to processing network byte order by splitting and reorganization.

2 Claims, 4 Drawing Sheets

(56) References Cited

FOREIGN PATENT DOCUMENTS

| | | |
|---|---|---|
| CN | 102065105 A | 5/2011 |
| CN | 103037032 A | 4/2013 |

OTHER PUBLICATIONS

Zhao, "IEC 61850-9-2 Process Bus Communication Interface for Light Weight Merging Unit Testing Environment", Aug. 2012, Master's Degree Project, Stockholm, Sweden, 74 pages.*
Wikipedia, "Data structure alignment", Feb. 11, 2012, 8 pages.*
Wikipedia, "IEC 61850", Oct. 4, 2011, 4 pages.*

* cited by examiner

| | 8 | 7 | 6 | 5 | 4 | 3 | 2 | 1 |
|---|---|---|---|---|---|---|---|---|
| MAC | MAC destination address (6 bytes) =0x010CCD040000~0x010CCD0401FF ||||||||
| | MAC source address (6 bytes) ||||||||
| Priority & tagged Ethertype | TPID (2 byte type) = 0x8100 ||||||||
| | TCI(2 bytes)=0x8000 ||||||||
| | Ethertype (2 bytes) =0x88BA ||||||||
| Header | APPID (2 bytes) =0x4000~0x7FFF ||||||||
| | Length (2 bytes) = 8+m ||||||||
| | Reserved 1 (2 bytes) =0x0000 ||||||||
| | Reserved 2 (2 bytes) =0x0000 ||||||||
| | APDU (m bytes) ||||||||
| MAC filling | (Pad bytes if necessary) (several bytes) ||||||||
| MAC check | CRC (4 bytes) ||||||||

Fig. 2

| Specification | Content |
| --- | --- |
| APDU data *TL | Type=60H |
| | Length |
| ASDU number | Type =80H |
| | Length=01 |
| | ASDU number |
| ASDU data *TL | Type =A2H |
| | Length |
| ASDU(1) *TL | Type =30H |
| | Length |
| SVID character string | Type=80H |
| | Length≤34 |
| | SVID character string |
| Sampling counter : smpCnt | Type =82H |
| | Length |
| | Count |
| Configuration version number (configuration times): INT32U | Type =83H |
| | Length≤4 |
| | confRev |
| synchronization mark: smpSynch, BOOLEAN | Type =85H |
| | Length =1 |
| | Sync |
| Sampling value: *TL | Type =87H |
| | Length |
| Channel 1 | data（4 bytes） |
| | q（4 bytes） |
| Channel 2 | data（4 bytes） |
| | q（4 bytes） |
| … Channel n | data（4 bytes） |
| | q（4 bytes） |
| …… ASDU(n) | …… |

Fig. 3

METHOD FOR MAKING 32-BIT ADDRESSING OF SV DATA BY UTILIZING FPGA

FIELD OF THE INVENTION

The present invention relates to digital technology in Smart Substation process layer, especially to SV data based on the ASN.1 coding rules.

BACKGROUND OF THE INVENTION

SV (sampling value) means digital sampling data transmitted on process layer of a smart substation in an intelligent grid. For SV Ethernet data based on Ethernet IEEE802.3, its sampling frequency of transmission is equal to or greater than 4000 Hz/s. This requires that the recipient has strong data processing ability.

The existing technologies mainly use an ordinary 8 bit addressing processor, which makes ASN.1 (Abstract Syntax Notation One) feature recognition and decoding bit by bit according to IEC61850-9-2 protocol. The decoding efficiency is not satisfactory. Furthermore, the data processing ability of the 8-bit addressing processor is far less than that of a specific DSP data processor with 32-bit addressing.

It requires that all data addresses should be aligned as per 32-bit format if 32-bit addressing is adopted and a DSP with large on-chip cache is used. In this way, the data to be processed can be read out in one read cycle. To achieve this, the SV Ethernet data conforming to IEC61850-9-2 protocol should be split and reorganized to form 32-bit aligned data by a method of programming DSP application software. However, this method not only increases the complexity and difficulty of the DSP application software, but also causes a dramatic decline in decoding efficiency, which leads to a poor overall performance of the SV data processing.

SUMMARY OF THE INVENTION

In order to overcome the deficiencies described above, the present invention provides a method of making 32-bit addressing of the SV data by using a FPGA (Field-Programmable Gate Array). It is to add a FPGA before a high-performance DSP with 32-bit addressing so as to split and reorganize the SV data according to IEC61850-9-2 protocol, thus to provide direct 32-bit addressable data to DSP. As a result, the data processing capability of the DSP is fully taken advantage of.

The present invention is to use a FPGA to align and reorganize Ethernet frame headers as per 32-bit according to SV data characteristics of IEC61850-9-2 protocol; the Application Protocol Data Unit (APDU) of the SV data is reorganized according to characteristics of the coding rules of ASN.1 thus 32-bit aligned data is formed; after that, the data is read out by the DSP with 32-bit addressing.

The present invention provides a method of making 32-bit addressing of the SV data by using a FPGA, in which the FPGA converts the received SV data conforming to IEC61850-9-2 protocol into data that may be read directly by 32-bit addressing processor. The method comprises the following steps:

(1) using a FPGA to receive Ethernet data;
(2) the FPGA screening the received data through Ethernet message type code; a data with message type code of 0x88BA refers to SV data, which is further processed through the following steps (3) and (4);

(3) memory units aligned in 32 bits being allocated for saving contents of Ethernet frame header in the SV data, data being copied during which data less than 32 bits is extended by filling 0, which is then saved in a memory; In the saved data, media access control data occupies three 32-bit units, while other data occupies one 32-bit unit; The contents of the Ethernet frame header include the following data: media access control data (MAC), priority and tags (Priority & tagged), datagram type code (Ethertype), application identity (APPID), length (Length), and reserved word (Reserved);

(4) Application protocol data unit (APDU) in the SV data is being reorganized by using 32-bit alignment, which is achieved by: according to the IEC61850-9-2 protocol, the application protocol data unit in the SV data consists of a number of data units created based on Abstract Syntax Notation One (i.e. ASN.1) coding rules; the tag and length information of each data unit created based on the ASN.1 coding rules are used to create a 32-bit data and one memory unit aligned in 32 bits is allocated to save it; data value is stored starting from next 32-bit memory unit; if any data unit created based on the ASN.1 coding rules is embedded in the data value, the foresaid procedure is repeated;

(5) The SV data reorganized through the steps (3) and (4) being transmitted to and read out by data processer DSP, wherein all the reorganized SV data are 32-bit aligned and stored.

The beneficial effects of the present invention are as follows:

The SV data being reorganized as 32-bit aligned one by FPGA may maximize the performance of DSP and greatly simplify the complexity and difficulty of DSP application software. The present invention may make the decoding efficiency of 32-bit addressing processor improved by 5-10 times, thus solve the problem of efficiency decline due to processing network byte order by splitting and reorganization.

BRIEF DESCRIPTION OF THE DRAWINGS

FIG. 2 shows a SV message frame format in IEC61850-9-2 protocol;

FIG. 3 shows a format of APDU of the SV data (each data unit created based on the ASN.1 coding rules)

DETAILED DESCRIPTION OF THE PREFERRED EMBODIMENTS

The disclosure will be explained more fully below in connection with a preferred embodiment and with reference to the drawings.

Figure 1:
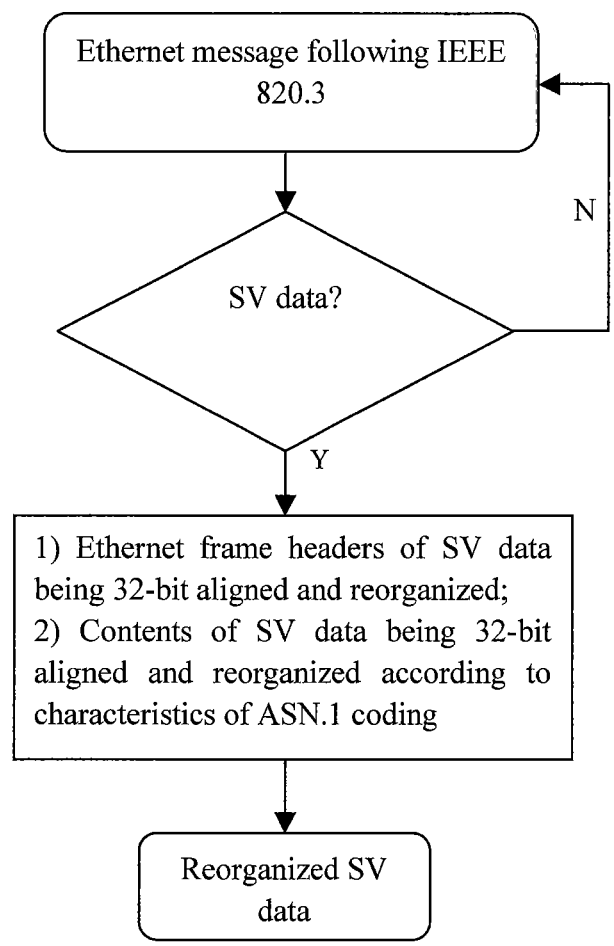
FIG. 1 shows a flow chart of the method according to one embodiment of the present disclosure.

The FPGA data flow of the method of utilizing FPGA to achieve 32-bit addressing for SV data is shown in FIG. 1, which includes five parts: (I) receiving Ethernet message; (II) screening SV (sampling value) data from Ethernet message; (III) making frame headers of SV Ethernet message 32-bit aligned and reorganized; (IV) making APDU of SV Ethernet message 32-bit aligned and reorganized; (V) outputting reorganized SV Ethernet message.

(I) Receiving Ethernet Message;

FPGA reads Ethernet message based on IEEE802.3 protocol from Ethernet physical layer chip PHY through media access control (MAC).

(II) Screening SV (Sampling Value) Data from Ethernet Message;

There are many kinds of Ethernet messages based on IEEE802.3. IEEE copyright registration organization registered an Ethernet type code based on ISO/IEC 8802-3 MAC sub layer, wherein Ethernet type code of the SV message is 0x88BA. FPGA screens SV data by the Ethernet type code.

Since the SV Ethernet message consists of message frame header and application protocol data unit APDU (see FIG. 2), the two parts adopt different strategies for 32-bit alignment and reorganization of data. 32-bit data alignment and reorganization of the two parts is illustrated as follows.

(III) Making Frame Headers of SV Ethernet Message 32-Bit Aligned and Reorganized;

Memory units aligned in 32 bits are allocated for saving contents of Ethernet frame header in the SV data, data being copied during which data less than 32 bits is extended by filling 0, which is then saved in a memory; In the saved data, media access control data occupies three 32-bit units, while other data occupies one 32-bit unit; The contents of the Ethernet frame header include the following data: media access control data (MAC), priority and tags (Priority & tagged), datagram type code (Ethertype), application identity (APPID), length (Length), and reserved word (Reserved).

Figure 4:
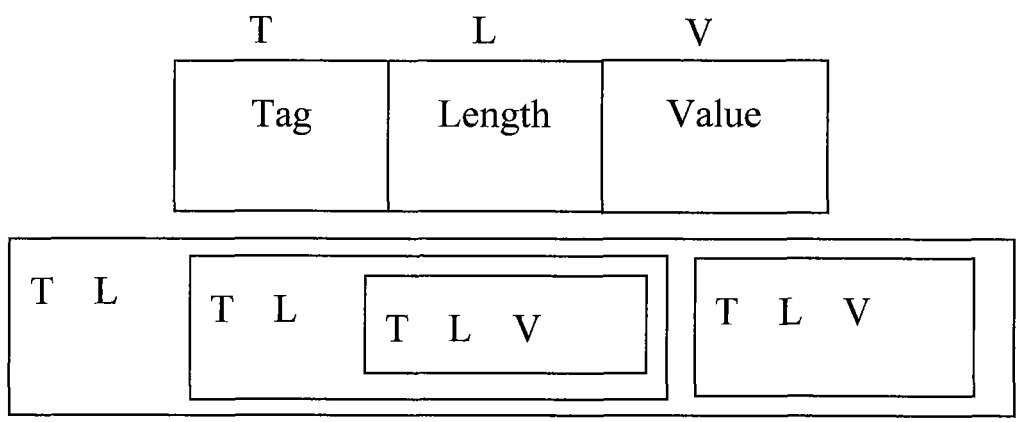
FIG. 4 shows the ASN.1 coding rules in IEC61850-9-2 protocol.

(IV) Making APDU of SV Ethernet Message 32-Bit Aligned and Reorganized;

Application protocol data unit APDU (see FIG. 3) consists of a plurality of data units according to the ASN.1 coding rules. The most important part of the present invention is that the application protocol data unit in the SV data is reorganized by using 32-bits alignment according to ASN.1 coding features, which reorganizes each data unit as 32-bit aligned data. Abstract Syntax Notation One (ASN.1) is a symbol used to describe information exchange between application communication programs, of which a basic format is TLV group. A TLV represents value of a variable: <Tag, Length, Value> and may be nested (see FIG. 4). In the present invention, a 32-bit data is composed of tag and length information of each data unit created based on the ASN.1 coding rules and one memory unit aligned in 32 bits is allocated to save it; data value of each data unit created based on the ASN.1 coding rules is stored starting from next 32-bit memory unit. Any data unit created based on the ASN.1 coding rules and embedded in the data value will be 32-bit aligned and reorganized again as per the above procedure. Each reorganized data unit according to the ASN.1 coding rules is described as:

```
typedef struct {
    uint32    tag:8;
    uint32    bytes_num:16;
    uint32    dwords_num:8;
    uint32    value[0...255];
} tAsn1Buff;
```

Among them, tag is "Tag" of the data unit according to ASN.1 coding rules, which accounts for the first 8 bits of the first 32-bit data; bytes_num is "Length" of the original data of the data unit according to ASN.1 coding rules, which accounts for the next 16 bits of the first 32-bit data; dwords_num is number of 32-bit memory units needed to store the data unit according to ASN.1 coding rules, which accounts for the last 8 bits of the first 32-bit data; value[0 . . . 255] is "Value" of the data unit according to ASN.1 coding rules. During this process, data less than 32 bits is extended by filling 0. Furthermore, if any data unit created based on the ASN.1 coding rules is embedded in the data value, it will be processed as per the described method.

(V) Outputting Reorganized SV Ethernet Message

The reorganized data is stored in FPGA memory and FPGA tells data processor DSP to read the data.

The invention claimed is:

1. A method for making 32-bit addressing of Sampling Value (SV) data by using a Field Programmable Gate Array (FPGA), in which the FPGA converts the received SV data conforming to IEC61850-9-2 protocol into data that may be read directly by 32-bit addressing processor, wherein the method comprises the following steps:

(1) using the FPGA to receive Ethernet data;
  (2) the FPGA screening the received data through Ethernet message type code; a data with message type code of 0x88BA refers to SV data, which is further processed through the following steps;
  (3) memory units aligned in 32 bits being allocated for saving contents of Ethernet frame header in the SV data, data being copied during which data less than 32 bits is extended by filling 0, which is then saved in a memory; In the saved data, media access control data occupies three 32-bit units, while other data occupies one 32-bit unit; The contents of the Ethernet frame header include the following data: media access control data (MAC), priority and tags (Priority & tagged), datagram type code (Ethertype), application identity (APPID), length (Length), and reserved word (Reserved);
  (4) application protocol data unit (APDU) in the SV data being reorganized by using 32-bit alignment, which is achieved by: according to the IEC61850-9-2 protocol, the application protocol data unit in the SV data consists of a number of data units created based on Abstract Syntax Notation One (ASN.1) coding rules; the tag and length information of each data unit created based on the ASN.1 coding rules are used to create a 32-bit data and one memory unit aligned in 32 bits is allocated to save it, wherein data for each of the tag information and length information is 32 bits; data value is stored starting from next 32-bit memory unit; if any data unit created based on the ASN.1 coding rules is embedded in the data value, the foresaid procedure is repeated;
  (5) The SV data reorganized through the steps (3) and (4) being transmitted to and read by data processor DSP, wherein all the reorganized SV data are 32-bit aligned and stored.

2. The method according to claim 1, wherein the SV data is converted into 32-bit aligned data according to the ASN.1 coding rules so as to be read directly by 32-bit addressing processor for processing digital sampling value conforming to IEC61850-9-2 protocol.

* * * * *